United States Patent
Robertson et al.

(10) Patent No.: US 10,279,900 B2
(45) Date of Patent: May 7, 2019

(54) ROTORCRAFT VARIABLE THRUST CROSS-FLOW FAN SYSTEMS

(71) Applicant: Bell Helicopter Textron Inc., Fort Worth, TX (US)

(72) Inventors: Daniel Bryan Robertson, Fort Worth, TX (US); Dudley Smith, Fort Worth, TX (US); Mark Dreier, Fort Worth, TX (US); Steve Ray Ivans, Fort Worth, TX (US); Kirk Landon Groninga, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 307 days.

(21) Appl. No.: 15/233,897

(22) Filed: Aug. 10, 2016

(65) Prior Publication Data

US 2018/0044009 A1 Feb. 15, 2018

(51) Int. Cl.
*B64C 27/82* (2006.01)
*B64C 27/06* (2006.01)
(Continued)

(52) U.S. Cl.
CPC ............ *B64C 27/82* (2013.01); *B64C 11/006* (2013.01); *B64C 27/06* (2013.01); *B64C 39/008* (2013.01);
(Continued)

(58) Field of Classification Search
CPC ....... B64C 3/141; B64C 11/006; B64C 27/78; B64C 27/82; B64C 39/005; B64C 39/008;
(Continued)

(56) References Cited

U.S. PATENT DOCUMENTS

| 1,487,228 A | 3/1924 | Emilio |
| 1,666,132 A | 4/1928 | Maurice et al. |

(Continued)

FOREIGN PATENT DOCUMENTS

| CN | 204674831 U | 9/2015 |
| CN | 104276284 B | 4/2016 |

(Continued)

OTHER PUBLICATIONS

European Examination Report, Application No. 16188806.0, European Patent Office, dated Aug. 30, 2017.
(Continued)

*Primary Examiner* — Nicholas McFall
(74) *Attorney, Agent, or Firm* — Lawrence Youst PLLC

(57) ABSTRACT

In some embodiments, a rotorcraft includes a fuselage, a tailboom, a drive system and a variable thrust cross-flow fan system. The cross-flow fan system includes a cross-flow fan assembly that is mechanically coupled to a drive shaft and operable to rotate with the drive shaft about a longitudinal axis. The cross-flow fan assembly includes first and second driver plates having a plurality of blades rotatably mounted therebetween. The blades are disposed radially outwardly from the longitudinal axis and have a generally circular path of travel when the cross-flow fan assembly rotates about the longitudinal axis. The blades are moveable between a plurality of pitch angle configurations. A control assembly is coupled to the blades. The control assembly is operable to change the pitch angle configuration of the blades to generate variable thrust at a substantially constant rotational speed of the cross-flow fan assembly.

19 Claims, 13 Drawing Sheets

(51) Int. Cl.
*B64C 11/00* (2006.01)
*B64C 39/00* (2006.01)
*F04D 17/04* (2006.01)
*F04D 29/36* (2006.01)

(52) U.S. Cl.
CPC ........... *F04D 17/04* (2013.01); *F04D 29/362* (2013.01); *B64C 2027/8245* (2013.01); *B64C 2027/8254* (2013.01); *F05D 2220/90* (2013.01)

(58) Field of Classification Search
CPC .... B64C 2027/8254; B63H 1/10; A63H 27/12
See application file for complete search history.

(56) References Cited

U.S. PATENT DOCUMENTS

| | | | |
|---|---|---|---|
| 1,936,786 | A | 11/1933 | Albert |
| 2,402,311 | A | 6/1946 | Bissett |
| 2,444,781 | A | 7/1948 | Leonard |
| 2,479,125 | A | 8/1949 | Leonard |
| 2,526,941 | A | 10/1950 | Meyer |
| 2,604,276 | A | 7/1952 | Huben |
| 2,866,608 | A | 12/1958 | Leonard |
| 3,059,876 | A | 10/1962 | Platt |
| 3,159,361 | A | 12/1964 | Weiland |
| 3,178,131 | A | 4/1965 | Nikolaus |
| 3,212,735 | A | 10/1965 | Nikolaus |
| 4,165,058 | A | 8/1979 | Whitener |
| 4,194,707 | A | 3/1980 | Sharpe |
| 5,100,080 | A | 3/1992 | Servanty |
| 5,176,338 | A | 1/1993 | Silich |
| 5,205,512 | A | 4/1993 | Rumberger |
| 5,265,827 | A | 11/1993 | Gerhardt |
| 5,289,994 | A | 3/1994 | Aguilera |
| 6,007,021 | A * | 12/1999 | Tsepenyuk ............ B64C 39/008 244/19 |
| 7,518,864 | B2 | 4/2009 | Kimura |
| 7,594,625 | B2 | 9/2009 | Robertson et al. |
| 7,641,144 | B2 | 1/2010 | Kummer et al. |
| 7,654,486 | B2 | 2/2010 | Milde, Jr. |
| 7,731,121 | B2 | 6/2010 | Smith et al. |
| 7,931,233 | B2 | 4/2011 | Arafat et al. |
| 8,469,308 | B2 | 6/2013 | Robertson et al. |
| 8,596,570 | B1 | 12/2013 | Carambat |
| 8,636,243 | B2 | 1/2014 | Robertson |
| 8,727,265 | B2 | 5/2014 | Altmikus et al. |
| 9,260,185 | B2 | 2/2016 | Covington et al. |
| 9,409,643 | B2 | 8/2016 | Mores et al. |
| 9,452,832 | B2 | 9/2016 | Heid |
| 9,789,959 | B2 | 10/2017 | Prisell |
| 2006/0054736 | A1 | 3/2006 | Milde |
| 2006/0151666 | A1 | 7/2006 | VanderMey et al. |
| 2006/0249621 | A1 | 11/2006 | Stephens |
| 2007/0200029 | A1 | 8/2007 | Sullivan |
| 2011/0121128 | A1* | 5/2011 | Balkus, Jr. ............ B64C 27/006 244/17.21 |
| 2011/0315809 | A1 | 12/2011 | Oliver |
| 2012/0091257 | A1 | 4/2012 | Wolff et al. |
| 2012/0111994 | A1 | 5/2012 | Kummer et al. |
| 2012/0256042 | A1* | 10/2012 | Altmikus ................ B64C 27/82 244/17.21 |
| 2012/0312916 | A1 | 12/2012 | Groninga |
| 2013/0026303 | A1 | 1/2013 | Wang |
| 2013/0119186 | A1 | 5/2013 | Heid |
| 2015/0048214 | A1 | 2/2015 | Bockmiller et al. |
| 2015/0183518 | A1 | 7/2015 | Stuckl et al. |
| 2015/0191245 | A1 | 7/2015 | Mores et al. |
| 2015/0197335 | A1 | 7/2015 | Dekel et al. |
| 2015/0225071 | A1 | 8/2015 | Tighe |
| 2015/0314865 | A1 | 11/2015 | Bermond et al. |
| 2016/0016652 | A1 | 1/2016 | Barrett et al. |
| 2016/0214710 | A1 | 7/2016 | Brody et al. |
| 2017/0003690 | A1 | 1/2017 | Tanahashi |
| 2017/0152935 | A1 | 6/2017 | Filter et al. |
| 2017/0361927 | A1 | 12/2017 | Lavagen et al. |

FOREIGN PATENT DOCUMENTS

| | | |
|---|---|---|
| EP | 2511177 A1 | 10/2012 |
| FR | 636843 A | 4/1928 |
| FR | 880130 A | 3/1943 |
| FR | 2375090 A1 | 7/1978 |
| GB | 885663 A | 12/1961 |
| GB | 2316374 A | 2/1998 |
| JP | 2009051381 A | 3/2009 |

OTHER PUBLICATIONS

European Examination Report, Application No. 17163296.1, EPO, dated Dec. 5, 2017.

European Examination Report, Application No. 16188806.0, European Patent Office, dated Jan. 26, 2018.

European Search Report, Application No. 16188806.0, European Patent Office, dated Aug. 8, 2017.

\* cited by examiner

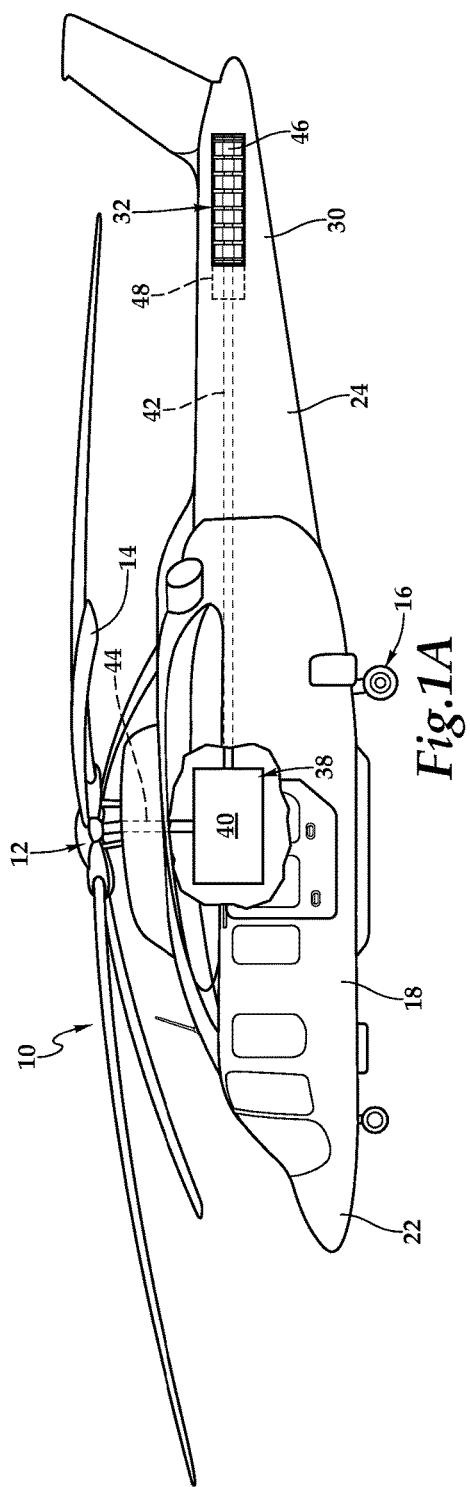
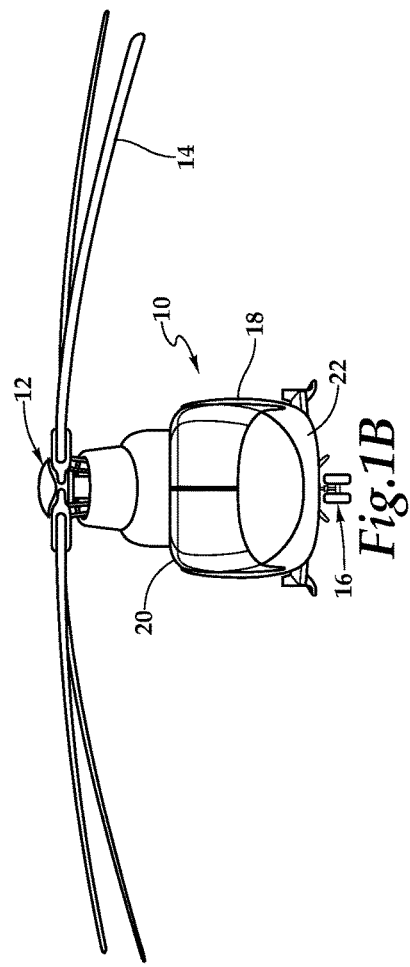
Fig.1A
Fig.1B

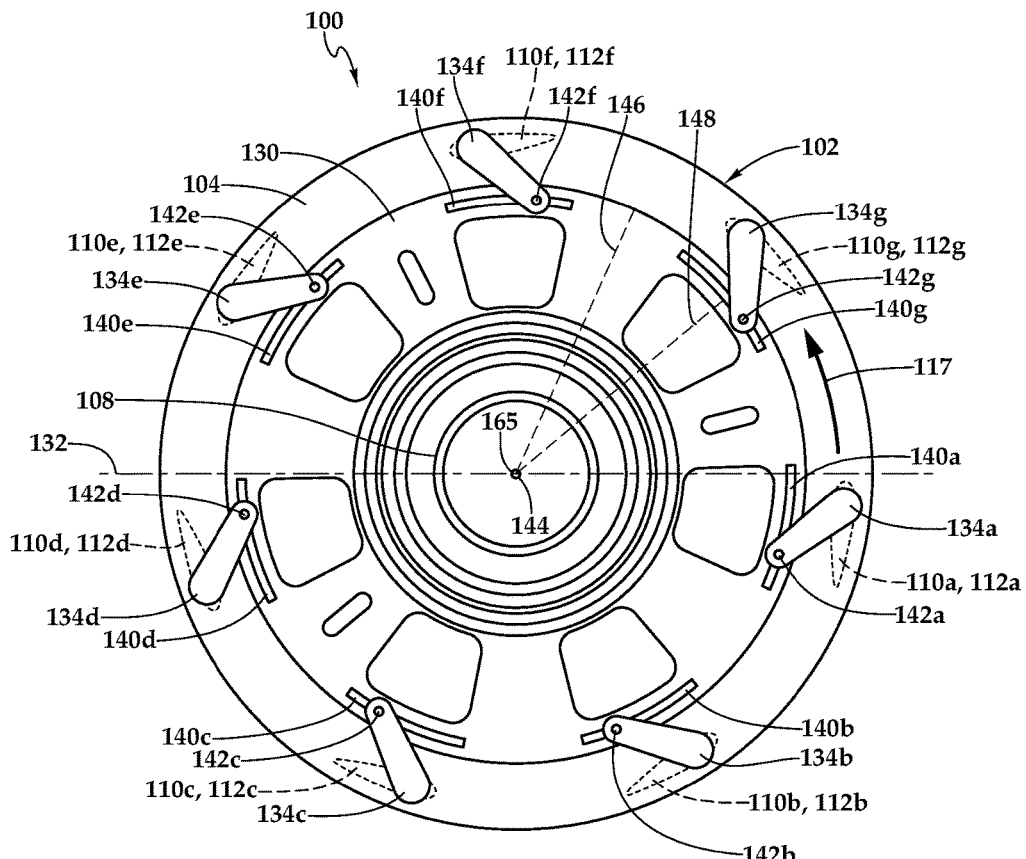
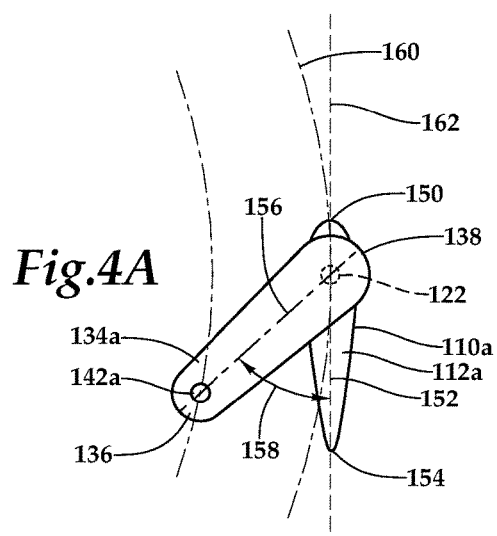

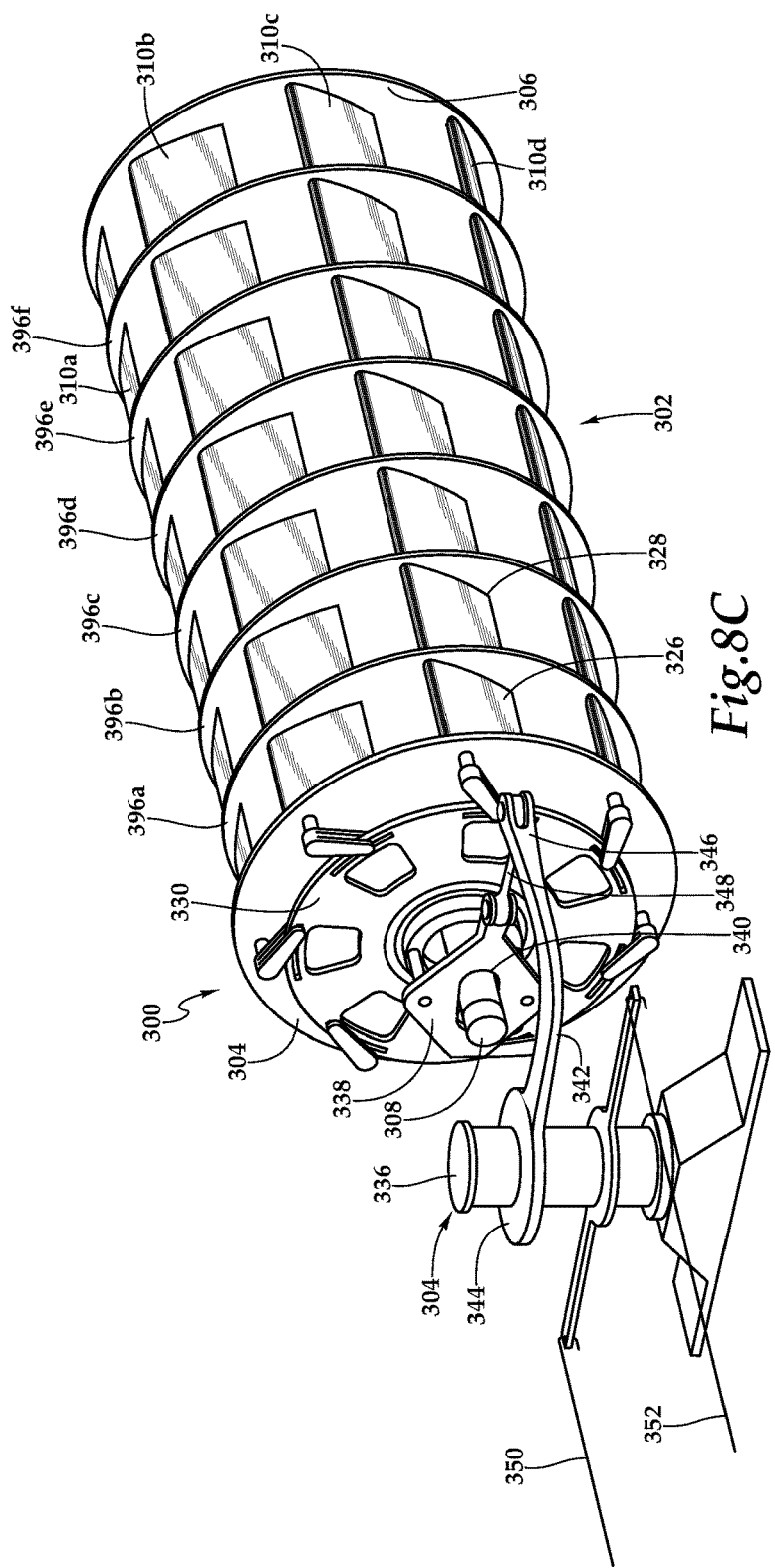

ROTORCRAFT VARIABLE THRUST CROSS-FLOW FAN SYSTEMS

TECHNICAL FIELD OF THE DISCLOSURE

The present disclosure relates, in general, to cross-flow fan systems for use on rotorcraft and, in particular, to cross-flow fan systems operable to be mountable in a tailboom of a rotorcraft and operable to provide variable thrust for anti-torque and yaw control of the rotorcraft.

BACKGROUND

The main rotor of a helicopter, which produces lift necessary for flight, also produces a counteracting torque force on the fuselage of the helicopter. The helicopter's tail rotor, located to the rear of the main rotor, is used to counteract this torque and to control the yaw of the helicopter. Tail rotors are typically mounted on a horizontal axis perpendicular to the direction of flight of the rotorcraft. The blades of a tail rotor typically change pitch to control thrust direction and intensity.

Traditional tail rotors have several drawbacks. First, because the tail rotor blades are large and openly exposed, they are susceptible to striking people or other objects while in operation. Second, the noise produced by traditional tail rotors can be unacceptably high, creating flyover acoustic problems. Such noise may be undesirable in a low noise environment or during clandestine activities. Traditional tail rotors may also create undesirable profile drag during flight, and/or cause thrust reduction during sideward flight.

Attempts have been made to use cross-flow fans to control helicopter yaw. It has been found, however, that cross-flow fans systems require redundancy of parts and detrimentally complex gearing and clutching schemes to provide thrust in more than a single direction. For example, rotorcrafts that employ cross-flow fans with unidirectional thrust functionality may require two or more cross-flow fans pointed in opposite directions to achieve thrust in both the pro-torque and anti-torque directions. Accordingly, the need has arisen for improved anti-torque systems for use on rotorcraft that have a reduced noise signature, a reduced impact risk and a reduced profile drag while also providing thrust in more than one direction.

SUMMARY

In a first aspect, the present disclosure is directed to a variable thrust cross-flow fan system for a rotorcraft. The system includes a cross-flow fan assembly having a longitudinal axis and including first and second driver plates having a plurality of blades rotatably mounted therebetween. The plurality of blades are disposed radially outwardly from the longitudinal axis such that the plurality of blades have a generally circular path of travel when the cross-flow fan assembly rotates about the longitudinal axis. The plurality of blades are moveable between a plurality of pitch angle configurations. A control assembly is coupled to the plurality of blades. The control assembly is operable to change the pitch angle configuration of the plurality of blades to generate variable thrust at a substantially constant rotational speed of the cross-flow fan assembly.

In certain embodiments, the control assembly may include a control cam that is operable to translate relative to the cross-flow fan assembly to change the pitch angle configuration of the plurality of blades. In some embodiments, the control cam is operable to rotate relative to the cross-flow fan assembly. In other embodiments, the control cam is substantially non-rotatable relative to the cross-flow fan assembly. In certain embodiments, the control assembly includes a control cam and a plurality of linkages. In such embodiments, the control cam may be coupled to the plurality of blades by the plurality of linkages, wherein each of the plurality of linkages has an inner end and an outer end with the inner end of each of the plurality of linkages slidably coupled to the control cam and the outer end of each of the plurality of linkages fixedly coupled to one of the plurality of blades. In some embodiments, the control cam forms at least one follower slot such that a follower pin on the inner end of each of the plurality of linkages may slidably engaged with the at least one follower slot. In other embodiments, the control cam forms a plurality of follower slots such that a follower pin on the inner end of each of the plurality of linkages may slidably engaged with one of the plurality of follower slots.

In some embodiments, the plurality of pitch angle configurations may include at least one right thrust configuration, a neutral configuration and at least one left thrust configuration. In certain embodiments, the plurality of pitch angle configurations may include a plurality of anti-torque thrust configurations and/or a plurality of pro-torque thrust configurations. In some embodiments, the plurality of pitch angle configurations may include pitch angle configurations wherein each of the plurality of blades changes pitch angle during each revolution around the generally circular path of travel, wherein each of the plurality of blades fluctuates between a positive pitch angle and a negative pitch angle during each revolution around the generally circular path of travel and wherein one or more blades of the plurality of blades has the negative pitch angle while one or more blades of the plurality of blades has the positive pitch angle.

In some embodiments, the variable thrust is a reversible thrust. In certain embodiments, the control assembly is operable to change the pitch angle configuration of the plurality of blades to selectively generate thrust in a plurality of directions including a first direction and a second direction. In such embodiments, the first direction may be substantially opposite from the second direction.

In some embodiments, the variable thrust cross-flow fan system may include an actuator assembly that is operably coupled to the control assembly and operable to translate the control assembly relative to the cross-flow fan assembly to change the pitch angle configuration of the plurality of blades.

In a second aspect, the present disclosure is directed to a rotorcraft including a fuselage, a tailboom extending from the fuselage, a drive system having an engine, transmission and a drive shaft extending at least partially within the tailboom and a variable thrust cross-flow fan system located at an aft portion of the tailboom. The variable thrust cross-flow fan system includes a cross-flow fan assembly mechanically coupled to the drive shaft and operable to rotate with the drive shaft about a longitudinal axis. The cross-flow fan assembly includes first and second driver plates having a plurality of blades rotatably mounted therebetween. The plurality of blades are disposed radially outwardly from the longitudinal axis such that the plurality of blades have a generally circular path of travel when the cross-flow fan assembly rotates about the longitudinal axis. The plurality of blades are moveable between a plurality of pitch angle configurations. A control assembly is coupled to the plurality of blades. The control assembly is operable to change the pitch angle configuration of the plurality of blades to generate variable thrust at a substantially constant rotational speed of the cross-flow fan assembly.

In some embodiments, the variable thrust cross-flow fan system provides anti-torque thrust for the rotorcraft. In certain embodiments, the variable thrust cross-flow fan system provides yaw control thrust for the rotorcraft. In various embodiments, the plurality of pitch angle configurations includes a plurality of anti-torque thrust configurations, a neutral configuration and a plurality of pro-torque thrust configurations.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIGS. 1A-1C are schematic illustrations of an exemplary rotorcraft operating a variable thrust cross-flow fan system in accordance with embodiments of the present disclosure;

FIGS. 3A-3C are side views of a variable thrust cross-flow fan system in accordance with embodiments of the present disclosure;

FIGS. 4A-4C are side views of a blade of a variable thrust cross-flow fan system having various pitch angles in accordance with embodiments of the present disclosure;

FIGS. 8A-8C are various isometric views a variable thrust cross-flow fan system and actuation assembly in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, unless otherwise indicated, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1C:
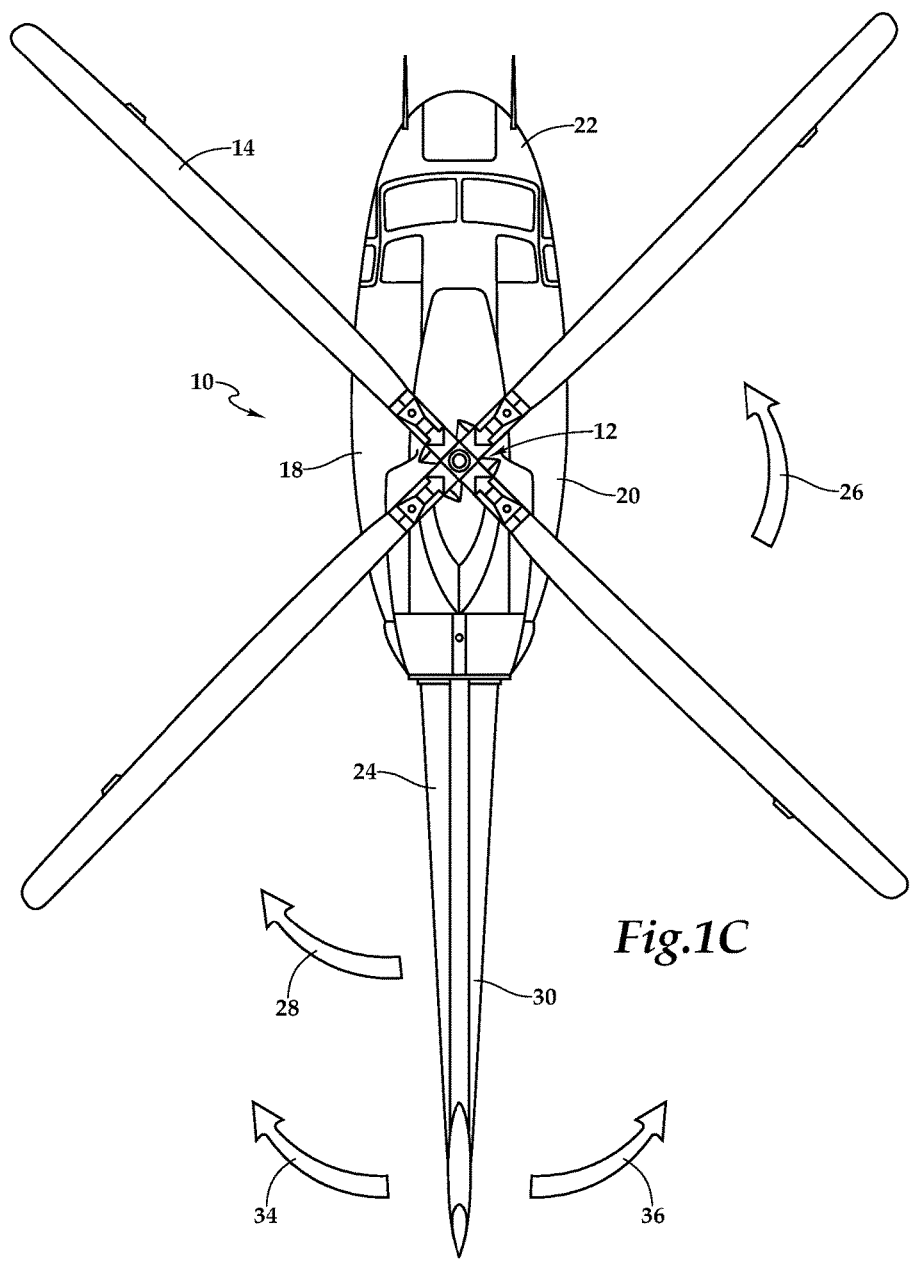
Figure 2:
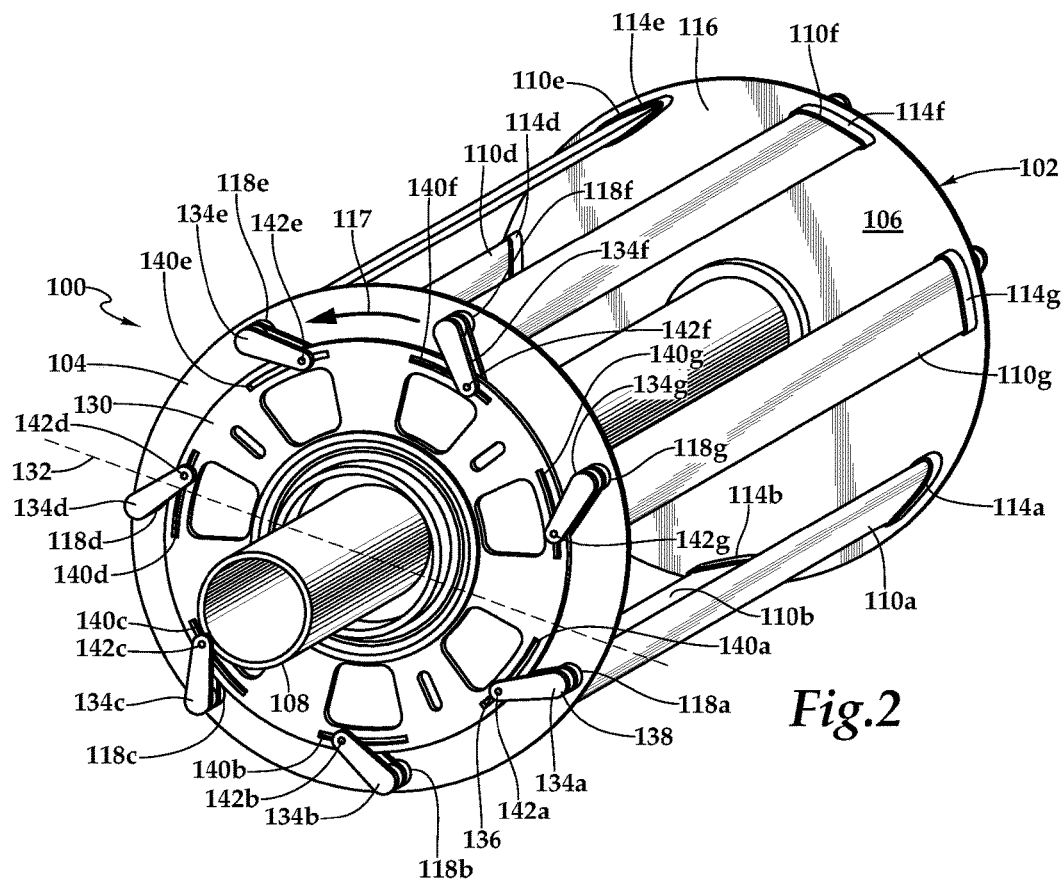
FIG. 2 is an isometric view of a variable thrust cross-flow fan system in accordance with embodiments of the present disclosure.

Referring to FIGS. 1A-1C, a rotorcraft 10 is schematically illustrated. Rotorcraft 10 has a main rotor 12 with a plurality of main rotor blades 14. The pitch of main rotor blades 14 can be collectively and cyclically manipulated to selectively control direction, thrust and lift of rotorcraft 10. Rotorcraft 10 has a landing gear system 16 to provide ground support for rotorcraft 10. Rotorcraft 10 includes a left side 18 and a right side 20. Rotorcraft 10 includes a fuselage 22, and a tailboom 24 extending from the rear of fuselage 22. Main rotor 12 rotates in a direction indicated by an arrow 26. Such rotation produces a torque on fuselage 22 in a direction indicated by an arrow 28. As used herein, including in the claims, the terms "left" and "right," unless otherwise indicated, refer to the port and starboard sides of an aircraft, respectively. For example, a "right" thrust refers to a thrust in the starboard direction of an aircraft. Conversely, a "left" thrust refers to a thrust in the port direction of an aircraft.

Aft portion 30 of tailboom 24 includes a variable thrust cross-flow fan system 32 that is operable to produce variable thrust in both a pro-torque direction 34 and an anti-torque direction 36. Variable thrust cross-flow fan system 32 is mounted along the longitudinal axis of tailboom 24. In some embodiments, variable thrust cross-flow fan system 32 may provide a multi-directional, including bi-directional, and variable intensity thrust to provide anti-torque and yaw control for rotorcraft 10. Variable thrust cross-flow fan system 32 is rotatable around a central longitudinal axis by a drive system 38. In the illustrated embodiment, drive system 38 includes an engine and transmission 40 and a drive shaft 42. Engine and transmission 40 provide torque and rotational energy to a drive shaft 44 that rotates main rotor 12. In addition, engine and transmission 40 provide torque and rotational energy to drive shaft 42. Drive shaft 42 may be a single long shaft or a series of shorter shafts and may preferably having flexible couplings to allow flexure. Drive shaft 42 mechanically couples to variable thrust cross-flow fan system 32. It should be noted that since engine 40 preferably operates at a constant rotational speed or velocity during flight operations, the gearing in transmission 42 is used to adjust the engine output to an optimum rotational speed for variable thrust cross-flow fan system 32.

As discussed herein, variable thrust cross-flow fan system 32 has a plurality of blades 46 that are rotated responsive to the rotation of drive shaft 42. Preferably, blades 46 of variable thrust cross-flow fan system 32 rotate at a constant speed proportional to that of main rotor 12 based upon the gear ratios of transmission 42. Rotating blades 46 of variable thrust cross-flow fan system 32 at a constant speed is advantageous, at this eliminates any additional systems and the associated complications necessary to enable variable speed rotation.

Variable thrust cross-flow fan system 32 produces a variable and reversible thrust, including thrusts in the pro-torque and anti-torque directions 34, 36, by changing the pitch, or angles of attack, of blades 46 of variable thrust cross-flow fan system 32 responsive to commands from an actuator assembly 48. Actuator assembly 48 may receive input from a pilot via anti-torque pedals or other source to operate variable thrust cross-flow fan system 32 to control the yaw of rotorcraft 10, including compensating for the torque on fuselage 22 caused by main rotor 12. In some embodiments, both the airflow and thrust produced by variable thrust cross-flow fan system 32 is substantially perpendicular to drive shaft 42, and therefore in a substantially lateral direction relative to rotorcraft 10.

It should be appreciated that rotorcraft 10 is merely illustrative of a variety of aircraft that can implement the embodiments disclosed herein. Other aircraft implementations can include hybrid aircraft, tilt rotor aircraft, unmanned aircraft, gyrocopters and a variety of helicopter configurations, to name a few examples. The illustrative embodiments may also be used on airplanes. It should be appreciated that even though aircraft are particularly well suited to implement the embodiments of the present disclosure, non-aircraft vehicles and devices can also implement the embodiments.

Referring to FIGS. 2, 3A-3C, 4A-4C and 5, a variable thrust cross-flow fan system, including various configurations thereof, is schematically illustrated and generally designated 100. Variable thrust cross-flow fan system 100 includes a cross-flow fan assembly 102. Cross-flow fan assembly 102 includes a forward driver plate 104 and an aft driver plate 106, which are coupled to, and rotatable by, drive shaft 108. Cross-flow fan assembly 102 also includes blades 110a-110g. Each blade 110a-110g has a respective forward end 112a-112g and a respective aft end 114a-114g. The forward ends 112a-112g of each of blades 110a-110g are rotatably coupled to an aft side of forward driver plate 104. The aft ends 114a-114g of blades 110a-110g are rotatably coupled to a forward side 116 of aft driver plate 106. Thus, when drive shaft 108 rotates forward and aft driver plates 104, 106, blades 110a-110g may rotate or pivot while rotating around drive shaft 108. In the illustrated embodiment, cross-flow fan assembly 102, along with blades 110a-110g, rotate in a direction indicated by an arrow 117. As used herein, the term "coupled" may include direct or indirect coupling by any means, including moving and non-moving mechanical connections.

Figure 5:
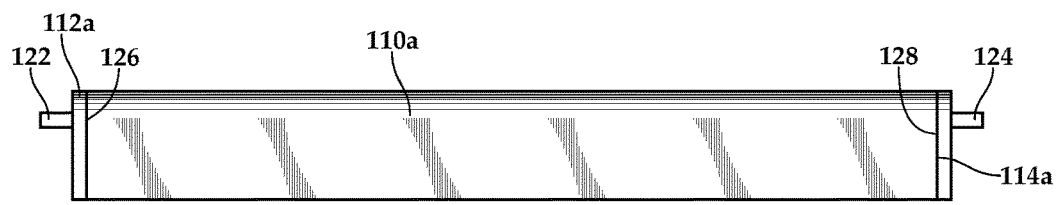
FIG. 5 is a top view of a blade of a variable thrust cross-flow fan system in accordance with embodiments of the present disclosure.

Forward driver plate 104 forms linkage holes 118a-118g. Driver plate 106 also forms corresponding linkage holes that are not visible in the illustrated embodiments. As best seen in FIG. 5, forward end 112a of blade 110a includes a forward driver pin 122 and aft end 114a of blade 110a include an aft driver pin 124. Blades 110b-110g include similar forward and aft driver pins. Each of the forward driver pins is insertable and rotatable within a respective linkage hole 118a-118g of forward drive plate 104. Likewise, each of the aft driver pins is insertable and rotatable within a respective linkage hole formed by aft driver plate 106. In the illustrated embodiment, driver pins 122, 124 are integral with or coupled to respective end caps 126, 128, as best seen in FIG. 5. In another embodiment, driver pins 122, 124 may be the opposite ends of a shaft (not shown) that extends longitudinally through the body of blade 110a.

Variable thrust cross-flow fan system 100 includes a control cam 130, which is movable relative to cross-flow fan assembly 102, and in particular to forward driver plate 104, along axis 132. In the illustrated embodiment, control cam 130 rotates at substantially the same speed and direction 117 as cross-flow fan assembly 102. Control cam 130 is coupled to blades 110a-110g. In particular, control cam 130 is coupled to blades 110a-110g by linkages 134a-134g. With particular reference to linkage 134a in FIG. 2, linkage 134a has an inner end 136 and an outer end 138. Outer end 138 of linkage 134a is fixedly coupled to forward driver pin 122 of blade 110a, and therefore blade 110a does not rotate relative to linkage 134a. Similarly, each of linkages 134a-134g is fixedly coupled to a respective one of blades 110a-110g, as illustrated.

Inner end 136 of linkage 134a is slidably coupled to control cam 130 at follower slot 140a of control cam 130. Similarly, inner ends of linkages 134b-134g are coupled to control cam 130 at follower slots 140b-140g of control cam 130. Follower slots 140a-140g allow the inner ends of linkages 134a-134g to move concentrically relative to control cam 130, while constraining the inner ends of linkages 134a-134g from moving in the radial direction. Referring again to linkage 134a as representative of all linkages 134a-134g, inner end 136 of linkage 134a includes a follower pin 142a that is at least partially inserted, and slidably engaged, with follower slot 140a. Indeed, follower pin 142a may slide along all or a portion of the length of follower slot 140a. In some embodiments, follower pin 142a may extend between two portions of linkage 134a that are on opposite sides of control cam 130. Similarly, follower pins 142a-142g on the inner end of each of linkages 134a-134g are slidably engaged with their respective follower slots 140a-140g in the same or similar manner as that described for linkage 134a. With particular reference to FIG. 3A, control cam 130 is generally circular having a center point 144 and radius 146. Each of follower slots 140a-140g form at least a portion of a circle, or circular arc, and has center point 144 and radius 148. In the illustrated embodiment, radius 146 of control cam 130 is larger than radius 148 of follower slots 140a-140g. Together, control cam 130, linkages 134a-134g and follower pins 142a-142g may be considered a control assembly coupled to blades 110a-110g.

With particular reference to FIG. 4A, blade 110a has leading edge 150 and chord line 152. Chord line 152 extends from leading edge 150 to trailing edge 154 of blade 110a. Chord line 152 has a length L. In some embodiments, forward driver pin 122 may be located a distance of approximately L/4, or quarter chord, from leading edge 150. In other embodiments, blade 110a may be rotatable around a point that is L/4 from leading edge 150, whether or not forward driver pin 122 is utilized. In yet other embodiments, forward driver pin 122, or a point of rotation for blade 110a, may be located anywhere along chord line 152. Each of blades 110a-110g may have the same or similar placement of a point of rotation or a forward driver pin as that described with respect to blade 110a in FIG. 4A.

In the illustrated embodiment, blades 110a-110g form an acute angle with the respective linkages 134a-134g to which they are coupled. With particular reference to FIG. 4A, linkage 134a has a centerline 156. Angle 158 formed between chord line 152 of blade 110a and centerline 156 of linkage 134a is an acute angle. In other embodiments, angle 158 may be another type of angle, such as an obtuse angle. Control cam 130 is shown in the illustrated embodiments to be circular, however, a control cam of the present disclosure may be any shape that enables some or all of the control cam functionality described in the illustrative embodiments. For example, control cam 130 may have an irregular shape, while still forming follower slots 140a-140g.

Cross-flow fan assembly 102, and therefore blades 110a-110g, may have any length depending on the application. Varying the length of blades 110a-110g may help to accommodate the centrifugal load on each of blades 110a-110g. By way of non-limiting example, blades 110a-110g may be on the order of one or more inches or one or more feet. In addition, while the illustrated embodiments show cross-flow fan assembly 102 to have seven blades 110a-110g, cross-flow fan assembly 102 may have any number of blades depending on the particular application both less than or greater than seven. The number of linkages, follower slots, follower pins and other parts accompanying each blade may also vary as the number of blades changes. Blades 110a-110g preferably have a shape suitable for providing thrust in accordance with the illustrative embodiments. By way of non-limiting example, blades 110a-110g may have an airfoil shape, arc shape or teardrop shape. Blades 110a-110g may also be either symmetric or non-symmetric along each blade's chord line. Blades 110a-110g may have any thickness or stiffness suitable to withstand the centrifugal load of the particular application and may be formed from any suitable material, including metals such as aluminum and composites such as carbon epoxy. Blades 110a-110g may be hollow or solid and may be formed using any suitable method of manufacture.

To produce thrust, blades 110a-110g may move into one of an infinite number of pitch angle configurations in response to movement of control cam 130 along axis 132. Control cam 130 is movable relative to forward driver plate 104, and in particular, control cam 130 is movable, or translatable, into an infinite number of positions along a plane substantially parallel to forward driver plate 104. By traveling along axis 132, control cam 130 rotates blades 110a-110g via linkages 134a-134g. While each of blades 110a-110g may have a different pitch angle, the positions of all of blades 110a-110g are referred to, in the collective sense, as pitch angle configurations. In some embodiments, the control assembly is operable to change the pitch angle configuration of blades 110a-110g to selectively generate thrust in a plurality of directions including a first direction and a second, opposite direction.

Figure 4B:
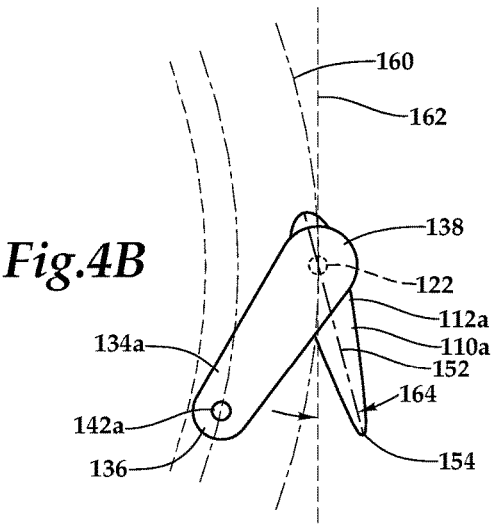

In the illustrated embodiment, blades 110a-110g rotate in a counterclockwise manner, indicated by arrow 117, along a circular path of travel 160. Depending on the pitch angle configuration, each blade 110a-110g may have a positive, negative or zero pitch angle at any particular point around circular path of travel 160 during each revolution. Blade 110a is shown to have substantially zero pitch in FIG. 4A, a positive pitch angle in FIG. 4B and a negative pitch angle in FIG. 4C. Referring particularly to FIG. 4A, circular path of travel 160 is the path along which forward driver pin 122 travels. A tangential projection 162 is also shown for blade 110a. For purposes of reference, tangential projection 162 is tangential to the circular path of travel 160 at a point at which circular path of travel 160 and forward driver pin 122 intersect. Tangential projection 162 may also be a line tangential to the circular path of travel of a point of rotation for blade 110a. In FIG. 4A, blade 110a may be considered to have substantially zero, or extremely low, pitch because the angle between tangential projection 162 and chord line 152 of blade 110a is substantially, or very close to, zero.

Figure 3B:
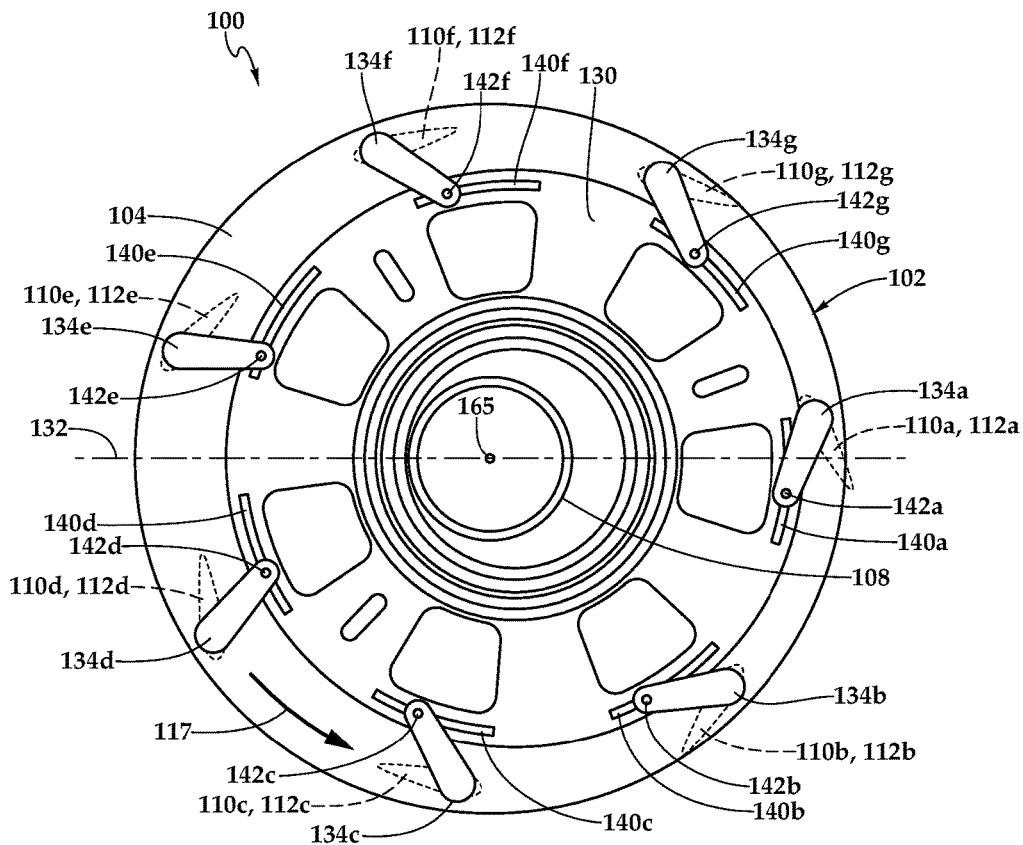
Figure 4C:
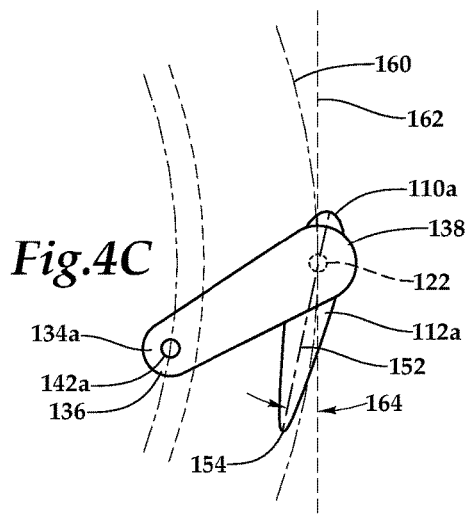

Referring to FIGS. 3B and 4B, blade 110a is shown to have a positive pitch angle. Blade 110a has a positive pitch angle because trailing edge 154 is biased away from center point 165 of circular path of travel 160 and angle 164 formed between chord line 152 and tangential projection 162 is non-zero. Referring to FIG. 4C, blade 110a has a negative pitch angle because trailing edge 154 of blade 110a is biased towards center point 165 of circular path of travel 160 and angle 164 formed between chord line 152 and tangential projection 162 is non-zero.

Figure 3C:
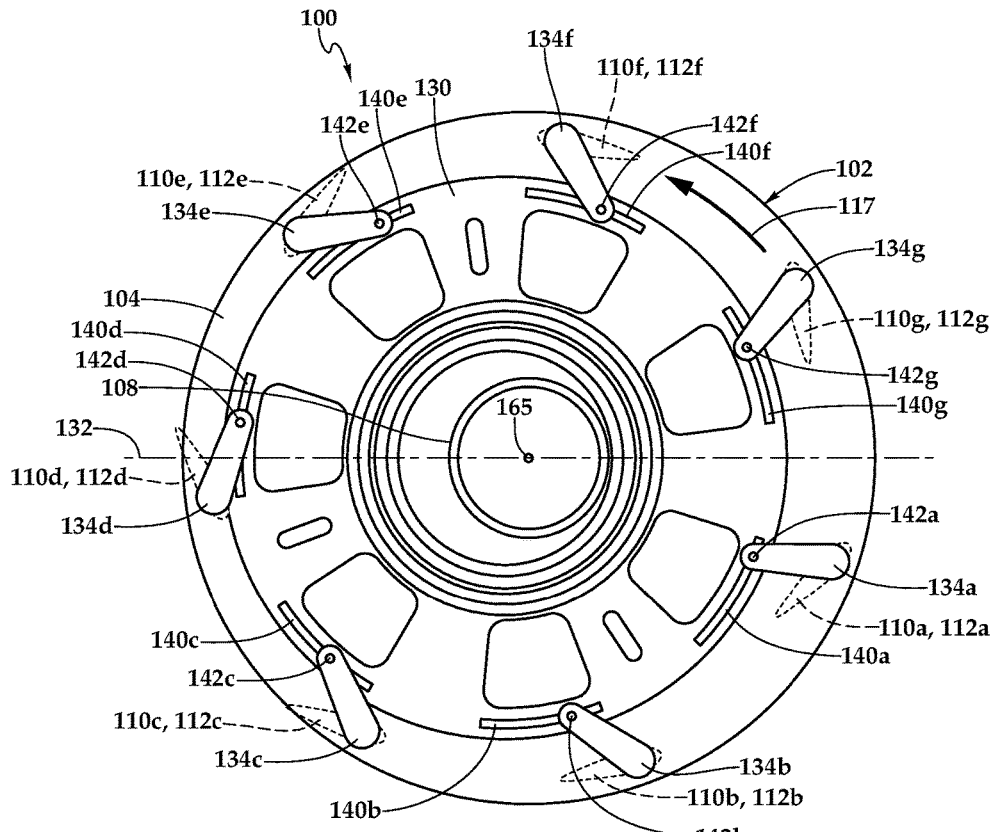

Referring to FIGS. 3A-3C, three positions of control cam 130 are shown. In FIG. 3A, control cam 130 is substantially concentric with drive shaft 108, forward driver plate 104 and circular path of travel 160. In this state, blades 110a-110g are in a neutral configuration and each of blades 110a-110g have a substantially zero pitch during each rotation around circular path of travel 160, as illustrated in FIG. 4A. When blades 110a-110g are in the neutral configuration, all of blades 110a-110g have a zero angle of attack, and therefore produce no thrust in either direction.

Referring to FIG. 3B, blades 110a-110g are in a right thrust configuration as a result of control cam 130 moving to a left position relative to the rotorcraft. In the right thrust configuration, the pitch angles of each of blades 110a-110g fluctuate between positive and negative pitch angles during each revolution around circular path of travel 160 such that a right thrust is produced thereby. When control cam 130 is in a position that causes blades 110a-110g to be in the right thrust position, blades 110a-110g rotate eccentrically in relation to control cam 130. Control cam 130 is also eccentric to the axis of rotation of both drive shaft 108 and cross-flow fan assembly 102 while in the right thrust position. Also, while in the right thrust position of the illustrated embodiment, the leftmost edges of control cam 130 and forward driver plate 104 are closer together than the rightmost edges of control cam 130 and forward driver plate 104. Control cam 130 moves in the opposite direction as the thrust produced when blades 110a-110g rotate along circular path of travel 160.

Blades 110a, 110b, 110g are located on a left portion of circular path of travel 160 and each have varying positive pitch angles depending on their respective locations in the rotation cycle. Blade 110a, which is substantially leftmost in circular path of travel 160, has the largest positive pitch angle of all blades 110a-110g. Each blade 110a-110g progressively moves into or out of this most positive pitch angle of blade 110a as each blade 110a-110g moves into or out of the substantially leftmost position at which blade 110a is shown.

Blades 110c, 110d, 110e, 110f are each on a right portion of circular path of travel 160 for blades 110a-110g. Blades 110c, 110d, 110e, 110f that are on the right portion of the circular path of travel 160 each have varying negative pitch angles. Each blade 110a-110g has its largest negative pitch angle when it reaches the rightmost point of circular path of travel 160. The pitch angles of blades 110a-110g are substantially zero at the topmost and bottommost points of circular path of travel 160, thereby causing substantially zero thrust in the vertical directions. Each of blades 110a-110g have substantially zero pitch angles twice during each revolution along circular path of travel 160, namely, at the topmost and bottommost points of circular path of travel 160. Taken together, the right thrust configuration of blades 110a-110g shown in FIG. 3B produces a rightward thrust for the rotorcraft as the blades 110a-110g rotate in the direction indicated by arrow 117. It will be appreciated that the right thrust may be either a pro-torque thrust or an anti-torque thrust, depending on the rotational direction of the rotors of the rotorcraft. Thus, the right thrust configuration shown in FIG. 3B may be either a pro-torque thrust configuration or an anti-torque thrust configuration.

Referring to FIG. 3C, control cam 130 has moved rightward, relative to the rotorcraft, from the neutral position of FIG. 3A to cause blades 110a-110g to move into a left thrust configuration. In the left thrust configuration, blades 110a-110g rotate, along arrow 117, to produce a left thrust for the rotorcraft. It will be appreciated that the left thrust may be either a pro-torque thrust or an anti-torque thrust, depending on the rotational direction of the rotors of the rotorcraft. Thus, the left thrust configuration shown in FIG. 3C may be either a pro-torque thrust configuration or an anti-torque thrust configuration. Similar to the right thrust configuration shown in FIG. 3B, in the left thrust configuration blades 110a-110g change pitch angle during each revolution around circular path of travel 160. In particular, in the left thrust configuration each of blades 110a-110g fluctuates between a positive and negative pitch angle during each revolution around circular path of travel 160.

Control cam 130 has moved in an opposite direction from the leftward thrust produced by blades 110a-110g in the left thrust configuration. Also, the distance between the leftmost point of control cam 130 and the leftmost point of forward driver plate 104 is greater than the distance between the rightmost point of control cam 130 and the rightmost point of forward driver plate 104. The circular path of travel 160 in the left thrust configuration is eccentric to control cam 130. In the left thrust configuration, control cam 130 is also eccentric to the axis of rotation of drive shaft 108 and cross-flow fan assembly 102. In the left thrust configuration, blades 110c, 110d, 110e, located on the right portion of circular path of travel 160, each have positive pitch angles that are different from one another. Blades 110a, 110b, 110f, 110g, located on the left portion of circular path of travel 160, each have varying negative pitch angles. Blades 110a-110g, when at the topmost or bottommost point of each revolution, have a substantially zero pitch angle, thereby producing substantially zero vertical thrust in the illustrated embodiment. Each of blades 110a-110g have substantially zero pitch angles twice during each revolution along circular path of travel 160, namely, at the topmost and bottommost points of circular path of travel 160, In the right and left thrust configurations shown in FIGS. 3B and 3C, each blade 110a-110g may produce a lift, or thrust, force approximately along a radial line between each blade's quarter chord point and center point 165 of circular path of travel 160. The thrust force generated by each blade 110a-110g may be proportional to the angle of attack, or pitch, of the individual blade. In the manner described, a pilot of the rotorcraft may vary the thrust of variable thrust cross-flow fan system 100 by changing the lateral position of control cam 130. The right and left thrusts described herein, opposite in direction, are produced by a single cross-flow fan assembly 102 that rotates at a substantially constant speed that is substantially equal to the rotational speed of drive shaft 108. Indeed, control cam 130 may be in an infinite number of positions along the axis 132 to produce an infinite number of potential thrust intensities in either the right or left direction. By producing a reversible thrust in this manner, a pilot of the rotorcraft, by controlling the position of control cam 130, may manage the yaw and torque forces experienced by the rotorcraft during flight.

Referring next to FIGS. 6A-6E and 7, a variable thrust cross-flow fan system is schematically illustrated and generally designated 200. Variable thrust cross-flow fan system 200 includes a plurality of blades 210a-210h that are shown in a variety of pitch angle configurations, which change in response to an input received from a pilot of the rotorcraft. FIGS. 6A-6E show a tailboom housing 274 having an upper portion 274a and lower portion 274b. The illustrated cross sections are viewed from a location aft of the rotorcraft such that tailboom housing 274 has a left portion 270 and a right portion 272. In the illustrated embodiment, it is noted that blades 210a-210h form obtuse angles with the respective linkages to which they are attached. As discussed above, blades 210a-210h may form either obtuse or acute angles with their respective linkages. Also, in the illustrated embodiment, blades 210a-210h rotate in a counterclockwise direction at a substantially constant speed during rotorcraft flight.

Figure 6A:
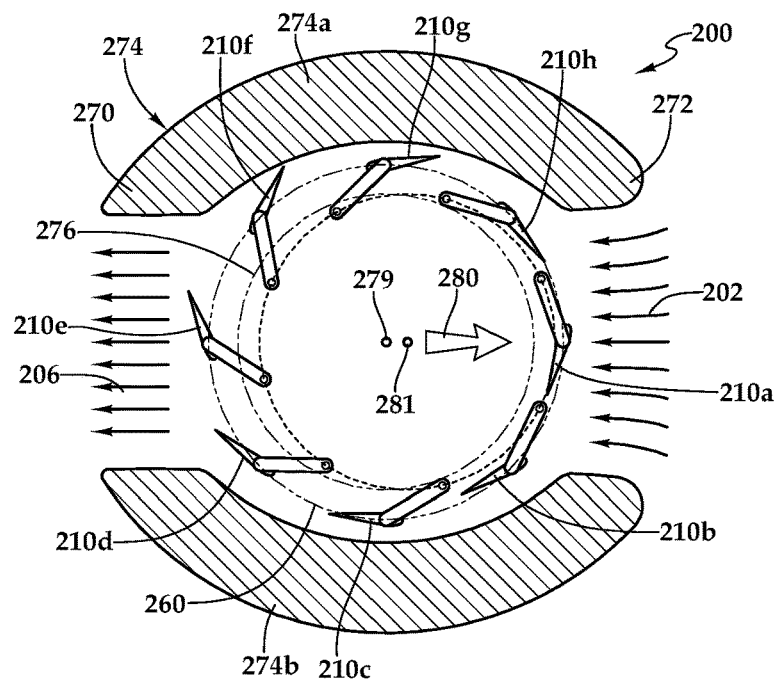
FIGS. 6A-6E are schematic illustrations of the blades of a variable thrust cross-flow fan system producing variable thrust in accordance with embodiments of the present disclosure.
Figure 6B:
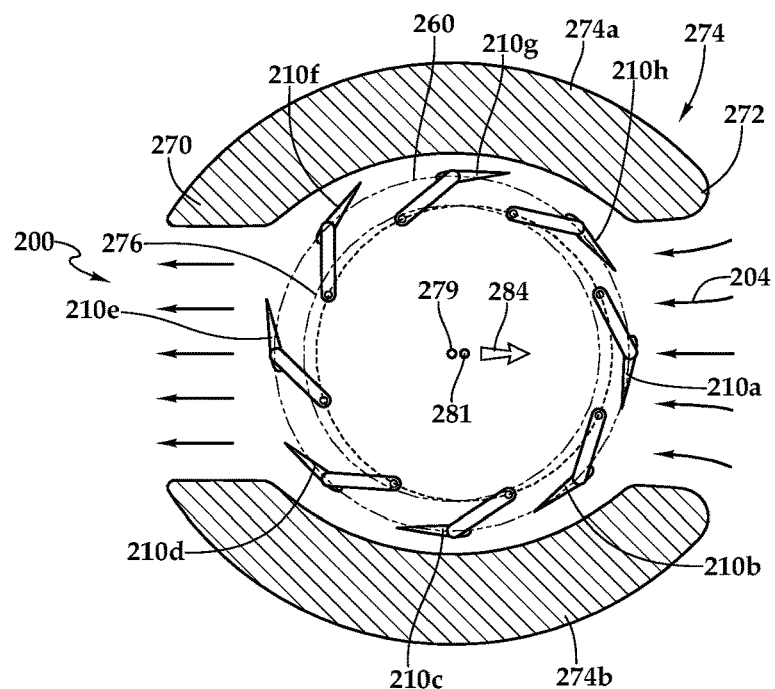
Figure 6C:
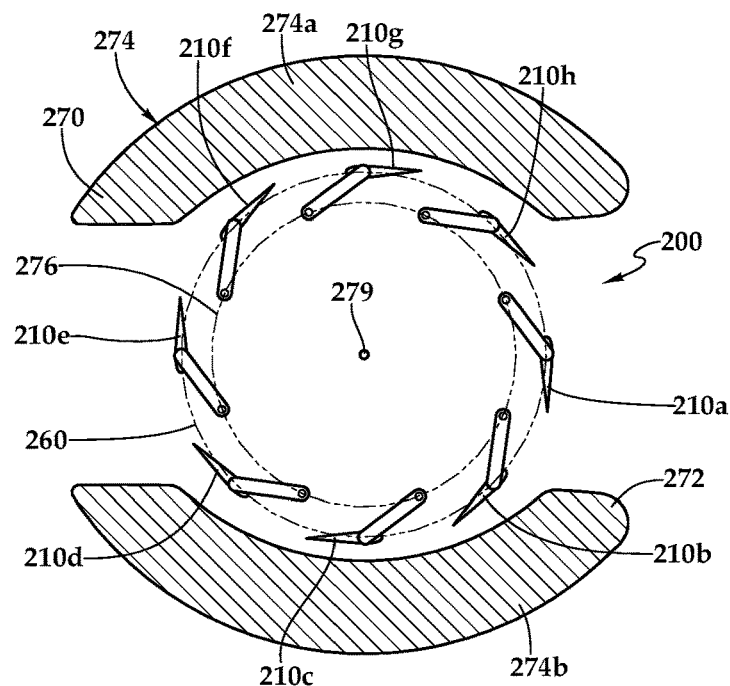

Referring specifically to FIG. 6C, blades 210a-210h are in a neutral pitch angle configuration as the control cam (not shown) is substantially concentric with circular path of travel 260 of blades 210a-210h. Input may be received from a pilot of the rotorcraft that causes the control cam to be shifted from the neutral position. For example, the input may be one or more anti-torque pedals in the cockpit of the rotorcraft. The anti-torque pedals may allow for varying degrees of input intensity, expressed as a continuum on the x-axis of FIG. 7. In particular, the anti-torque pedals may allow for input ranging from −100% to 100%, and all points therebetween. Other examples of input controls by which the control cam may be moved to produce a reversible thrust include a control stick, buttons, knobs, sliders, voice controls, touchscreen controls or electronic input, to name a few. Each of these input controls may allow for the continuum of input positions expressed on the x-axis of FIG. 7. In this manner, the reversible thrust produced by variable thrust cross-flow fan system 200 may have a direction and intensity that is determined by the input position originating from the cockpit of the rotorcraft or elsewhere.

In the present example, in which blades 210a-210h have a neutral pitch angle configuration, substantially zero thrust is produced. A neutral position center point 279, which is the center point of the control cam when the control cam is in the neutral configuration, is shown. Further, the input position originating from an input control of the rotorcraft may be at 0%, as indicated by point 278 in FIG. 7. Moving to FIG. 6A, a maximum right thrust 280 is produced by blades 210a-210h in the depicted pitch angle configuration. In this right thrust configuration, maximum right thrust 280 is at 100% of variable thrust cross-flow fan system's thrust range (−100% to 100%), as indicated by point 282 in FIG. 7. Maximum right thrust 280 corresponds with an input position of 100% from one of the exemplary input controls described above.

In the maximum right thrust configuration of FIG. 6A, the control cam has moved rightward of neutral position 276 of the control cam to a maximum allowable extent. The distance that the control cam has moved is schematically illustrated by showing neutral position center point 279 relative to center point 281 of the control cam. It is also noted that the control cam has moved in the same direction as the thrust produced by blades 210a-210h. This is in contrast to the illustrative embodiments shown in FIGS. 2, 3A-3C, 4A-4C and 5, in which the control cam moved in an opposite direction as the thrust produced by the blades of the variable thrust cross-flow fan system 100. Among other factors, the direction that the control cam moves relative to the thrust direction may be caused by whether the angle between each blade and its respective linkage is acute or obtuse. Air flows through blades 210a-210h as indicated by high-density airflow arrows 202. It is noted that air flows through blades 210a-210h in an opposite direction as the thrust produced by blades 210a-210h.

Figure 7:
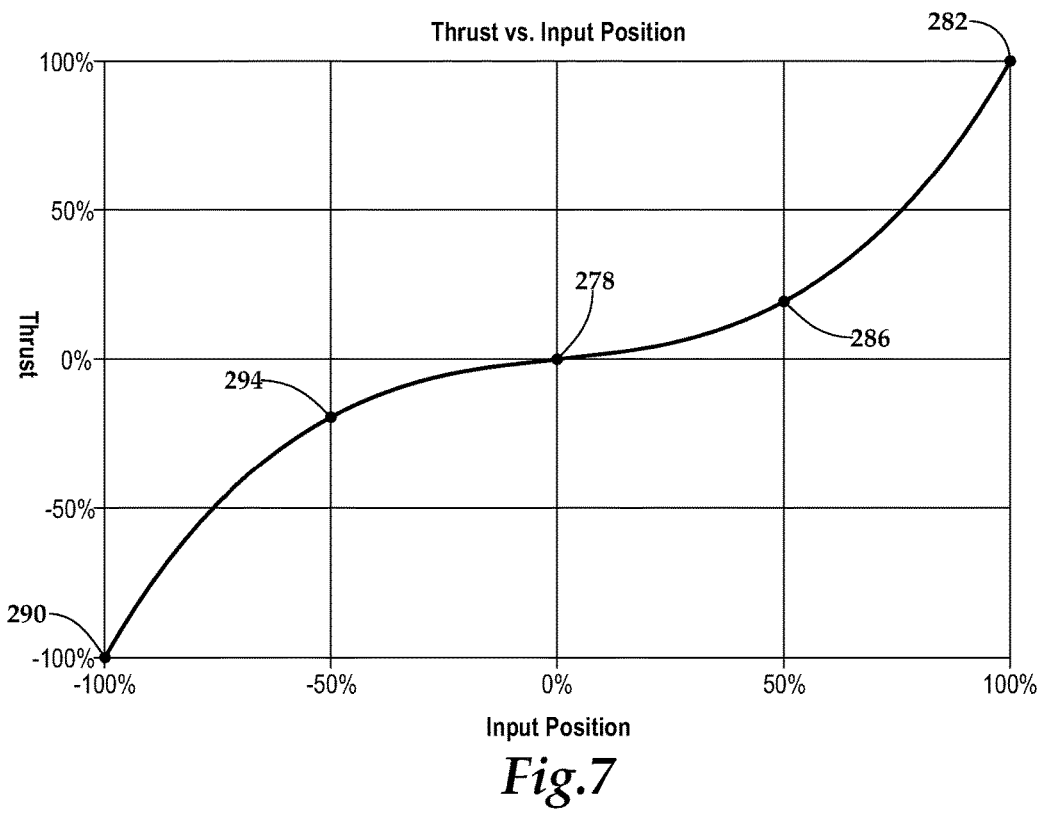
FIG. 7 is a chart illustrating position versus thrust for a variable thrust cross-flow fan system in accordance with embodiments of the present disclosure.

Moving to FIG. 6B, blades 210a-210h remain in a right thrust pitch angle configuration. However, the control cam is closer to neutral position 276 than it was in FIG. 6A, thereby causing an intermediate right thrust 284, which is less than maximum right thrust 280 in FIG. 6A. The reduced thrust is generated as the maximum pitch angles of blades 210a-210h is reduced and the air flow through variable thrust cross-flow fan system 200 is reduced as indicated by the reduced density airflow arrows 204. The distance that the control cam has moved is schematically illustrated by showing neutral position center point 279 relative to center point 281 of the control cam. With reference to FIG. 7, intermediate right thrust 284 is approximately 20% of maximum right thrust 280, as indicated by point 286. In the illustrated embodiment, an input position of 50% produces the intermediate right thrust 284 of approximately 20% of maximum right thrust 280.

In the right thrust configurations shown in FIGS. 6A and 6B, as each blade 210a-210h follows circular path of travel 260, blades 210a-210h transition between positive pitch, zero pitch, negative pitch, zero pitch and back to positive pitch during each revolution of the cross-flow fan assembly. As blades 210a-210h approach the leftmost point of circular path of travel 260, the blades have progressively greater positive pitch reaching a maximum positive pitch at the leftmost point of circular path of travel 260. Thereafter, as blades 210a-210h retreat from the leftmost point of circular path of travel 260, the blades have progressively lesser positive pitch reaching zero pitch proximate bottommost point of circular path of travel 260. As blades 210a-210h approach the rightmost point of circular path of travel 260, the blades have progressively greater negative pitch reaching a maximum negative pitch at the rightmost point of circular path of travel 260. Thereafter, as blades 210a-210h retreat from the rightmost point of circular path of travel 260, the blades have progressively lesser negative pitch, reaching zero pitch proximate topmost point of circular path of travel 260. Each blade 210a-210h repeats this cycle on each revolution of the cross-flow fan assembly.

Figure 6D:
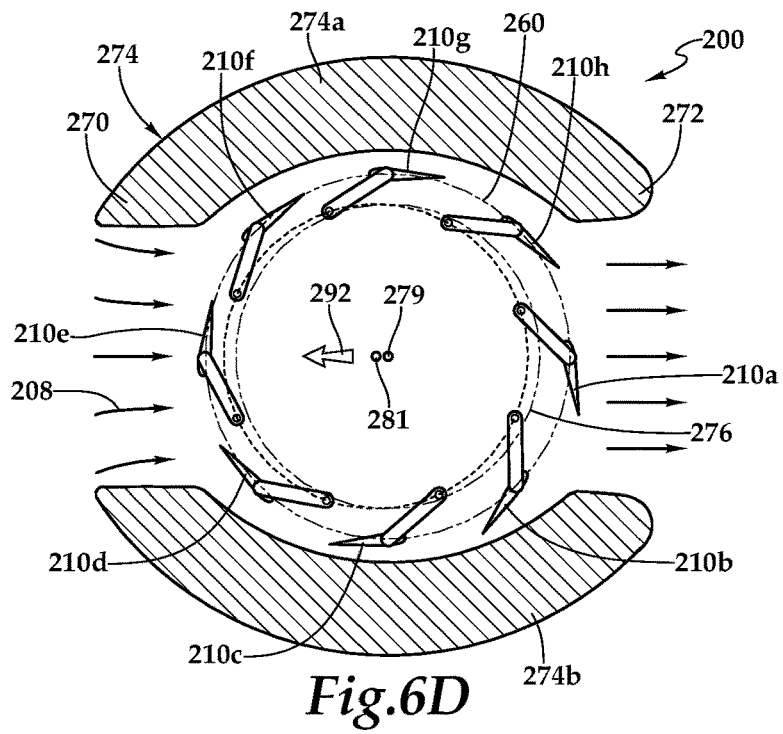
Figure 6E:
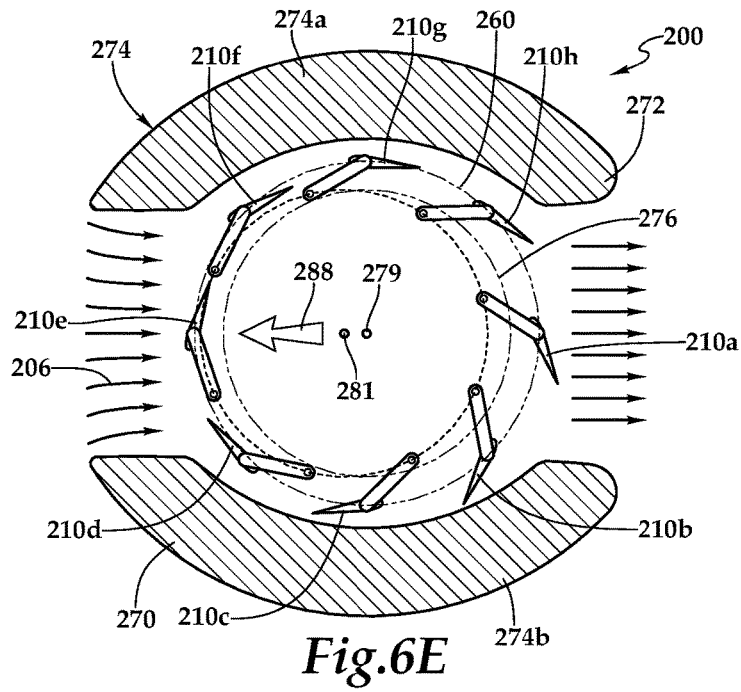

With reference to FIG. 6E, a maximum left thrust 288 is produced by blades 210a-210h in the depicted pitch angle configuration which corresponds to point 290 in FIG. 7 and the −100% location on the continuum of −100% to 100%. When blades 210a-210h produce maximum left thrust 288, the control cam has been moved a maximum allowable distance to the left of neutral position 276. The distance that the control cam has moved is schematically illustrated by showing neutral position center point 279 relative to center point 281 of the control cam. In the illustrated embodiment, a leftward move of the control cam corresponds to a leftward thrust. The left thrust that is produced by blades 210a-210h is the opposite of the airflow direction through blades 210a-210h, as indicated by high-density airflow arrows 206. As shown in FIG. 7, maximum left thrust 288 corresponds with an input position of −100% from one of the exemplary input controls described above.

Finally, with reference to FIG. 6D, blades 210a-210h produce an intermediate left thrust 292 in the depicted pitch angle configuration. Intermediate left thrust 292 is less than maximum left thrust 288. In particular, intermediate left thrust 292 is approximately 20% of maximum left thrust 288, as indicated by point 294 in FIG. 7. The control cam is closer to neutral position 276 than in the maximum left thrust configuration of FIG. 6E. The distance that the control cam has moved is schematically illustrated by showing neutral position center point 279 relative to center point 281 of the control cam. To achieve intermediate left thrust 292, the input position has been set at −50% from one of the exemplary input controls described above, as shown in FIG. 7. The reduced thrust is generated as the maximum pitch angles of blades 210a-210h is reduced and the air flow through variable thrust cross-flow fan system 200 is reduced as indicated by the reduced density airflow arrows 208.

In the left thrust configurations shown in FIGS. 6D and 6E, as each blade 210a-210h follows circular path of travel 260, blades 210a-210h transition between positive pitch, zero pitch, negative pitch, zero pitch and back to positive pitch during each revolution of the cross-flow fan assembly. As blades 210a-210h approach the rightmost point of circular path of travel 260, the blades have progressively greater positive pitch reaching a maximum positive pitch at the rightmost point of circular path of travel 260. Thereafter, as blades 210a-210h retreat from the rightmost point of circular path of travel 260, the blades have progressively lesser positive pitch reaching zero pitch proximate topmost point of circular path of travel 260. As blades 210a-210h approach the leftmost point of circular path of travel 260, the blades have progressively greater negative pitch reaching a maximum negative pitch at the leftmost point of circular path of travel 260. Thereafter, as blades 210a-210h retreat from the leftmost point of circular path of travel 260, the blades have progressively lesser negative pitch, reaching zero pitch proximate bottommost point of circular path of travel 260. Each blade 210a-210h repeats this cycle on each revolution of the cross-flow fan assembly.

FIGS. 6A-6E illustrate that the variability of the thrust based upon the pitch angle configuration of blades 210a-210h which varies responsive to control cam movement. As illustrated and described, the thrust generated by variable thrust cross-flow fan system 200 is variable in both intensity and direction, either a leftward or rightward direction, and is therefore reversible. Even though five pitch angle configurations of blades 210a-210h have been shown in FIGS. 6A-6E, it should be understood by those skilled in the art that blades 210a-210h may have an infinite number of pitch angle configurations producing an infinite number of thrust intensities, by moving the control cam along an infinite number of possible points along an axis lateral to the direction of travel of the rotorcraft. Indeed, with reference to FIG. 7, the thrust intensity and direction may vary according to the illustrated curve, including any point thereon. In this manner, a pilot may vary the input position of an input control to vary the thrust intensity and direction produced by variable thrust cross-flow fan system 200 to manage the yaw and anti-torque of the rotorcraft. Even though a particular input versus torque curve has been depicted and described, it should be understood by those skilled in the art that the input versus torque curve for a particular implementation will vary based upon factors including the size, shape and materials used to form the blades, the number of blades, the rotational speed of the cross-flow fan system and other parameters.

Figure 8A:
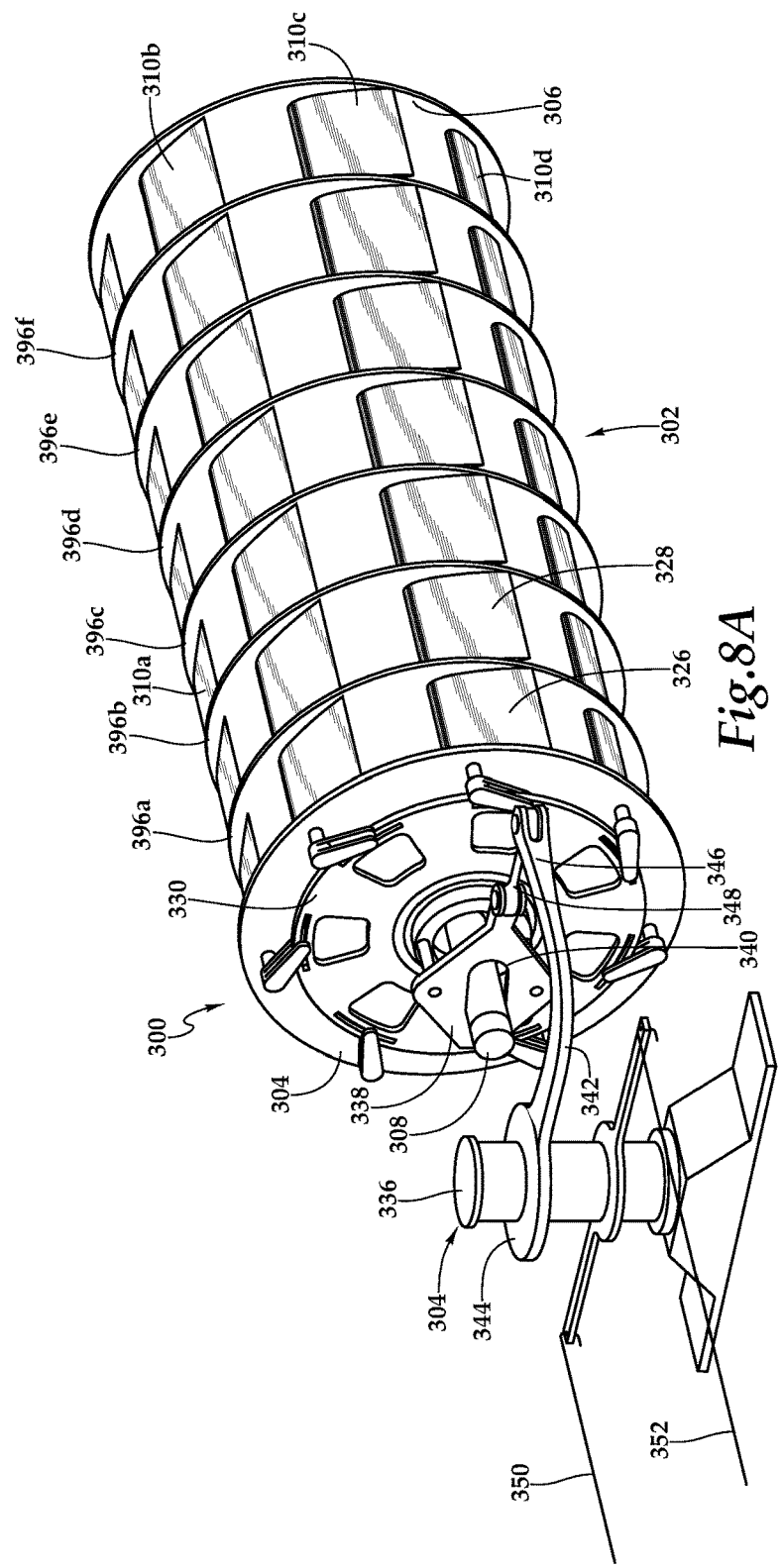
Figure 8B:
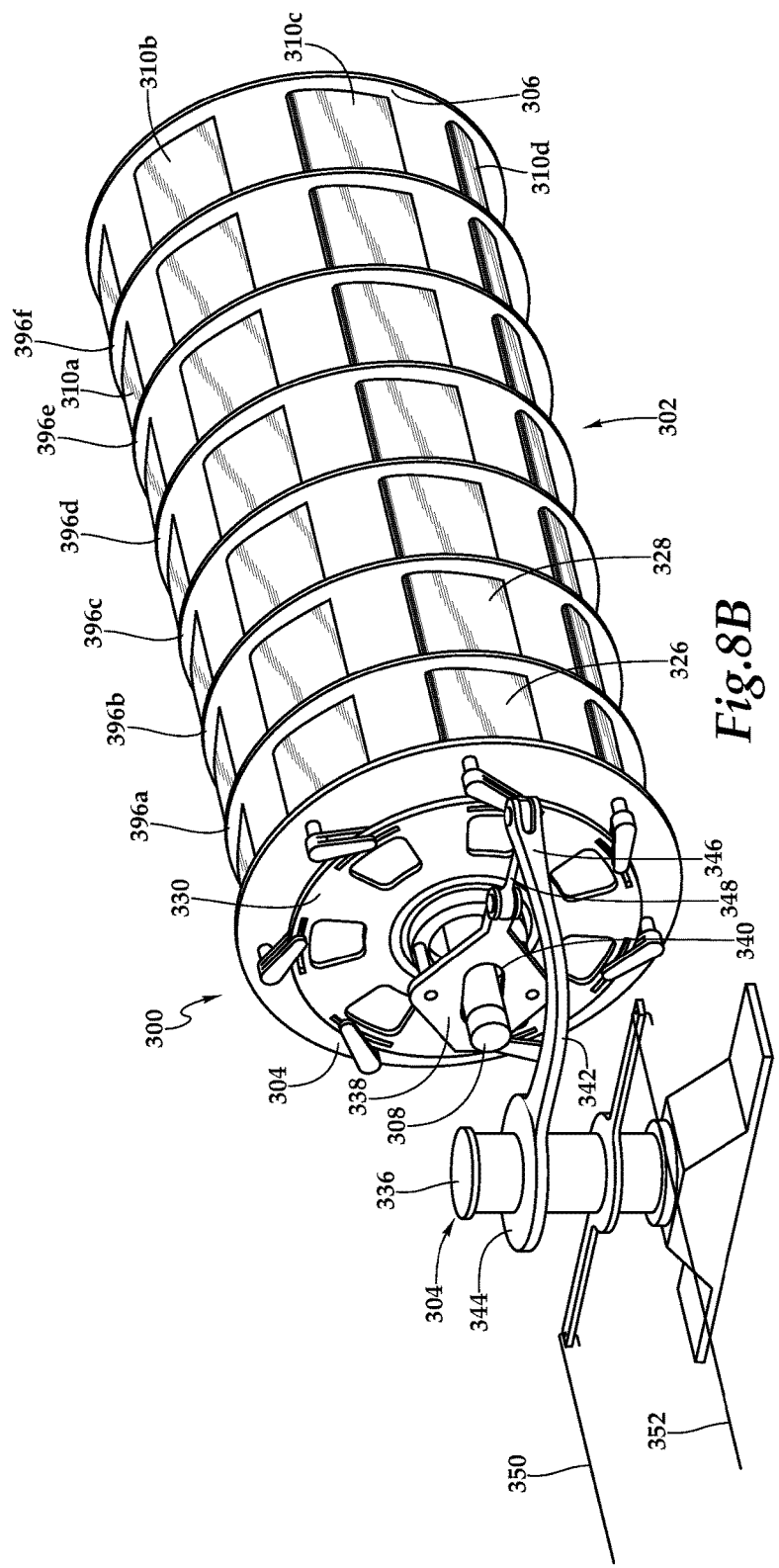

Referring now to FIGS. 8A-8C, a variable thrust cross-flow fan system is schematically illustrated and generally designated 300. In the illustrative embodiment, variable thrust cross-flow fan system 300 includes a plurality of blades, only blades 310a-310d being visible, wherein each of the blades is divided into seven blade segments. The blade segments of each blade 310a-310d are separated by divider plates 396a-396f, which are disposed at regular intervals between forward driver plate 304 and aft driver plate 306. Each of divider plates 396a-396f is substantially parallel to both forward driver plate 304 and aft driver plate 306. In addition, divider plates 396a-396f may be substantially the same shape as forward driver plate 304 and aft driver plate 306. Each divider plate 396a-396f divides adjacent segments of each blade 310a-310d. For example, divider plate 396a divides blade segments 326, 328 of blade 310c. By dividing blades 310a-310d into smaller blade segments, divider plates 396a-396f may increase the tolerance of blades 310a-310d to centrifugal forces resulting from the rotation of cross-flow fan assembly 302.

FIGS. 8A-8C also show an actuator mechanism 304 by which control cam 330 may be moved in order to change the pitch configurations of blades 310a-310d. In particular, variable thrust cross-flow fan system 300 includes an input receiving post 336 that is adjacent to control cam 330 and rotatable about a vertical axis. A bypass plate 338 is coupled to control cam 330. Bypass plate 338 includes an aperture 340. Drive shaft 308 passes through aperture 340 of bypass plate 338 and is foreshorten in the illustrated embodiment for clarity of presentation. Aperture 340 provides lateral clearance for drive shaft 308 such that when bypass plate 338 moves along a lateral plane parallel to forward drive plate 304, bypass plate 338 and drive shaft 308 are substantially non-touching. Such clearance prevents bypass plate 338 from interfering with the rotation of drive shaft 308.

A bell crank 342 includes a first end 344 and a second end 346. First end 344 of bell crank 342 is coupled to input receiving post 336. Second end 346 of bell crank 342 is coupled to an extender link 348, which is coupled to bypass plate 338. Wires 350, 352 are coupled to input receiving post 336. The position of wires 350, 352 may respond to an input position, such as the input positions shown in FIG. 7. Wires 350, 352 may be moved by the pilot of the rotorcraft, which in turn rotates input receiving post 336 and thereby moves bypass plate 338 and control cam 330 into one of several positions along a plane substantially parallel to forward driver plate 304. Movement of control cam 330, as described above, causes blades 310a-310d to move into a particular pitch angle configuration. Therefore, moving wires 350, 352, via input from an input control, changes the thrust intensity and direction produced by blades 310a-310d.

Referring specifically to FIG. 8B, blades 310a-310d are in a neutral configuration, thereby creating substantially zero thrust while in constant speed rotation. Referring to FIG. 8A, wires 350, 352 have been operated to rotate input receiving post 336 and cause blades 310a-310d to move into a right thrust configuration. Referring to FIG. 8C, wires 350, 352 have been operated to rotate input receiving post 336 to cause blades 310a-310d to move into a left thrust configuration. In one non-limiting example, wires 350, 352 may be attached to anti-torque pedals located in a cockpit of the rotorcraft. The anti-torque pedals may allow for input positions along a continuum of −100% to 100% as shown in FIG. 7, depending on how far each anti-torque pedal is depressed. Even though a particular actuation mechanism 304 for operating control cam 330 and thus the intensity and direction of thrust generated by variable thrust cross-flow fan system 300 has been described and depicted, it should be understood by those skilled in the art that other actuation mechanisms could be used to operate a control cam and variable thrust cross-flow fan system of the present disclosure. For example, an actuation mechanism of the present disclosure could alternatively be a hydraulic actuation mechanism, an electrically actuation mechanism in a fly-by-wire environment, or other suitable actuation mechanism operable to allow for input anywhere along the spectrum shown on the x-axis of FIG. 7.

Figure 9:
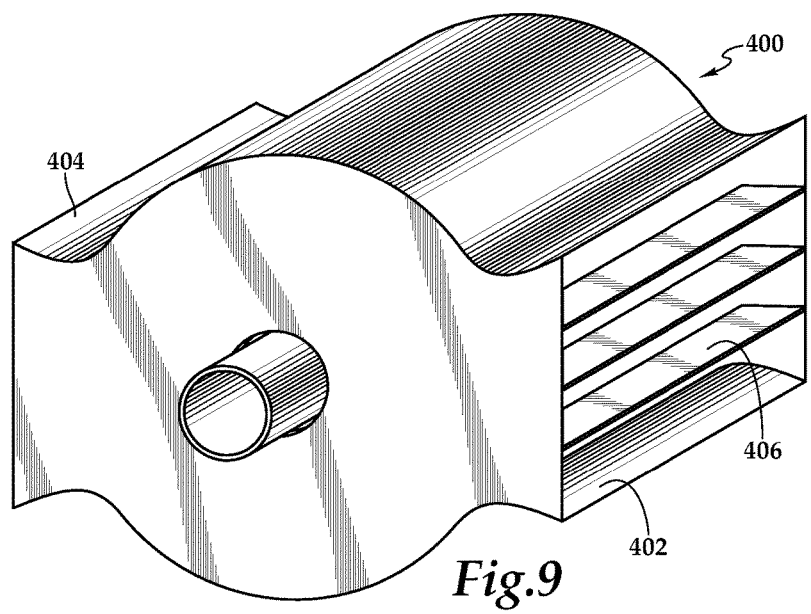
FIG. 9 is an isometric view of a housing for a variable thrust cross-flow fan system in accordance with embodiments of the present disclosure.

Referring to FIG. 9, a housing assembly for a variable thrust cross-flow fan system is schematically illustrated and generally designated 400. Housing 400 provides an enclosure for the moving parts of a variable thrust cross-flow fan system and forces air flow to follow a predetermined path. Housing 400 may be mounted in or be formed integrally with a tailboom of a rotorcraft. In the illustrated embodiment, housing 400 includes a left duct 402, which may open onto the left side of the tailboom. Housing 400 also includes a right duct 404, which may open up to the right side of the tailboom. Left duct and right duct 402, 404 allow air to pass through the housing 400 so that thrust may be generated in accordance with the illustrative embodiments described above. Each duct 402, 404 includes a plurality of horizontal slats 406 to provide for directional control of the airflow and thrust of variable thrust cross-flow fan system. Slats 406 may be adjustable or movable based on input from a pilot to enable thrust vectoring operations. For example, slats 406 may be tilted such that a left thrust generated by the variable thrust cross-flow fan system has an upward or downward component, thereby providing pitch, in addition to yaw, control of the rotorcraft.

Alternatively or additionally, duct 402, 404 could include vertical slats for additional directional control of the airflow and thrust of variable thrust cross-flow fan system. Furthermore, while housing 400 is shown to have oppositely disposed ducts on its left and right side, a housing of the present disclosure may have ducts in other locations and other orientations, including top ducts, bottom ducts, or any combination of two or more ducts disposed about a variable thrust cross-flow fan system of the present disclosure. In embodiments in which alternate thrust patterns are permitted, the control cam may be allowed to travel in directions other than the lateral horizontal axis of the rotorcraft to enable variable thrust. For example, the control cam may be allowed to travel diagonally or vertically in order to create the desired thrust direction and intensity the variable thrust cross-flow fan system. By allowing for a thrust in all radial directions surrounding the tailboom, a pilot may control both the yaw and pitch of the rotorcraft.

Housing 400 may be used to achieve a pressure differential that allows for more efficient thrust. In some examples, an 80-100% improvement in thrust may be achievable using such a pressure differential. Housing 400 also provides protection for the blades of the variable thrust cross-flow fan system, such as by preventing objects from hitting the blades. Housing 400 also prevents injury by creating a barrier between people and the blades.

Figure 10:
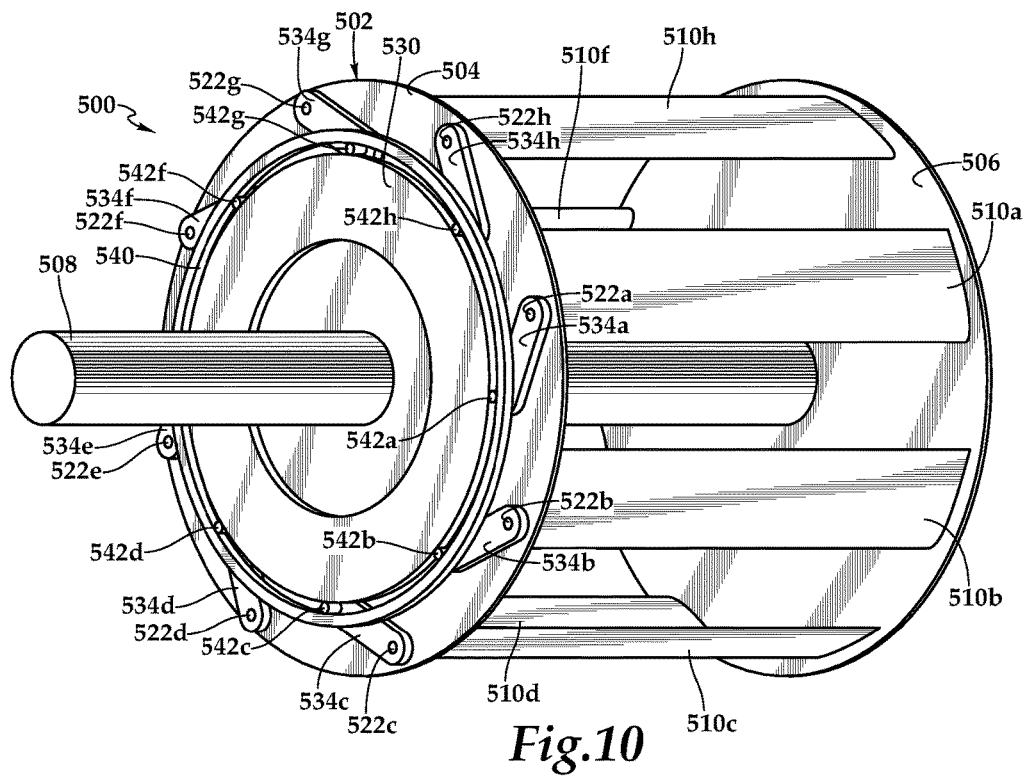
FIG. 10 is an isometric view of a variable thrust cross-flow fan system in accordance with embodiments of the present disclosure.

Referring to FIG. 10, a variable thrust cross-flow fan system is schematically illustrated and generally designated 500. Variable thrust cross-flow fan system 500 includes a plurality of blades 510a-510h that are rotatably coupled to driver plates 504, 506. Blades 510a-510h are fixably coupled to respective linkages 534a-534h via driver pins 522a-522h. In contrast to previously illustrated embodiments, control cam 530 is non-rotating relative to cross-flow fan assembly 502 and drive shaft 508. Instead, control cam 530 includes one continuous follower slot 540 along which follower pins 542a-542h may move. Together, control cam 530, linkages 534a-534h, driver pins 522a-522h and follower pins 542a-542h may be considered a control assembly coupled to blades 510a-510h. As described in the above embodiments, movement of control cam 530 moves blades 510a-510h into different pitch angle configurations to provide variable thrust as well as reversible thrust in two or more directions.

While the illustrative embodiments are described as providing thrust for a rotorcraft, or indeed for any object on which the variable thrust cross-flow fan system is mounted, the illustrative embodiments may also be used as a turbine in, for example, a generator. In these alternative embodiments, the pitch angle configuration of the blades may be changed in order to most effectively receive or harness a fluid, such as air or water, to turn the cross-flow fan assembly in a manner that produces energy.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A variable thrust cross-flow fan system for a rotorcraft, the system comprising:
    a cross-flow fan assembly having a longitudinal axis and including first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations;
    a control assembly coupled to the plurality of blades, the control assembly including a control cam operable to translate relative to the cross-flow fan assembly to change the pitch angle configuration of the plurality of blades; and
    an actuator assembly operably coupled to the control cam, the actuator assembly operable to translate the control cam relative to the cross-flow fan assembly to change the pitch angle configuration of the plurality of blades to generate variable thrust at a substantially constant rotational speed of the cross-flow fan assembly;
    wherein the cross-flow fan assembly is operable to produce a thrust in one of a first or second direction in response to the actuator assembly translating the control cam leftward relative to the cross-flow fan assembly and is further operable to produce a thrust in the other of the first or second direction in response to the actuator assembly translating the control cam rightward relative to the cross-flow fan assembly, the first direction substantially opposite from the second direction.

2. The variable thrust cross-flow fan system as recited in claim 1 wherein the control cam is operable to rotate relative to the cross-flow fan assembly.

3. The variable thrust cross-flow fan system as recited in claim 1 wherein the control cam is substantially non-rotatable relative to the cross-flow fan assembly.

4. The variable thrust cross-flow fan system as recited in claim 1 wherein the control assembly further comprises a plurality of linkages, the control cam coupled to the plurality of blades by the plurality of linkages wherein each of the plurality of linkages has an inner end and an outer end, the inner end of each of the plurality of linkages slidably coupled to the control cam, the outer end of each of the plurality of linkages fixedly coupled to one of the plurality of blades.

5. The variable thrust cross-flow fan system as recited in claim 4 wherein the control cam forms at least one follower slot;
    wherein the inner end of each of the plurality of linkages includes a follower pin; and
    wherein the follower pin of each of the plurality of linkages is slidably engaged with the at least one follower slot.

6. The variable thrust cross-flow fan system as recited in claim 4 wherein the control cam forms a plurality of follower slots;
    wherein the inner end of each of the plurality of linkages includes a follower pin; and
    wherein the follower pin of each of the plurality of linkages is slidably engaged with one of the plurality of follower slots.

7. The variable thrust cross-flow fan system as recited in claim 1 wherein the plurality of pitch angle configurations includes at least one right thrust configuration, a neutral configuration and at least one left thrust configuration.

8. The variable thrust cross-flow fan system as recited in claim 1 wherein the plurality of pitch angle configurations includes a plurality of anti-torque thrust configurations.

9. The variable thrust cross-flow fan system as recited in claim 1 wherein the plurality of pitch angle configurations includes a plurality of pro-torque thrust configurations.

10. The variable thrust cross-flow fan system as recited in claim 1 wherein the plurality of pitch angle configurations includes pitch angle configurations wherein each of the plurality of blades changes pitch angle during each revolution around the generally circular path of travel.

11. The variable thrust cross-flow fan system as recited in claim 1 wherein the plurality of pitch angle configurations includes pitch angle configurations wherein each of the plurality of blades fluctuates between a positive pitch angle and a negative pitch angle during each revolution around the generally circular path of travel.

12. The variable thrust cross-flow fan system as recited in claim 11 wherein the plurality of pitch angle configurations includes pitch angle configurations wherein one or more blades of the plurality of blades has the negative pitch angle while one or more blades of the plurality of blades has the positive pitch angle.

13. The variable thrust cross-flow fan system as recited in claim 1 wherein the variable thrust is a reversible thrust.

14. The variable thrust cross-flow fan system as recited in claim 1 wherein the control cam forms one or more concentric follower slots.

15. The variable thrust cross-flow fan system as recited in claim 14 wherein the control assembly further comprises a plurality of linkages coupled to the plurality of blades and slidably engaged with the one or more concentric follower slots, the one or more concentric follower slots operable to translate relative to the cross-flow fan assembly, in response to translation of the control cam, to change the pitch angle configuration of the plurality of blades.

16. A rotorcraft, comprising:
    a fuselage;
    a tailboom extending from the fuselage, the tailboom having an aft portion;

a drive system having an engine, transmission and a drive shaft extending at least partially within the tailboom; and a variable thrust cross-flow fan system located at the aft portion of the tailboom, the variable thrust cross-flow fan system including:

a cross-flow fan assembly mechanically coupled to the drive shaft and operable to rotate with the drive shaft about a longitudinal axis, the cross-flow fan assembly including first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations;

a control assembly coupled to the plurality of blades, the control assembly including a control cam operable to translate relative to the cross-flow fan assembly to change the pitch angle configuration of the plurality of blades; and an actuator assembly operably coupled to the control cam, the actuator assembly operable to translate the control cam relative to the cross-flow fan assembly to change the pitch angle configuration of the plurality of blades to generate variable thrust at a substantially constant rotational speed of the cross-flow fan assembly;

wherein the cross-flow fan assembly is operable to produce a thrust in one of a first or second direction in response to the actuator assembly translating the control cam leftward relative to the cross-flow fan assembly and is further operable to produce a thrust in the other of the first or second direction in response to the actuator assembly translating the control cam rightward relative to the cross-flow fan assembly, the first direction substantially opposite from the second direction.

17. The rotorcraft as recited in claim 16 wherein the variable thrust cross-flow fan system provides anti-torque thrust for the rotorcraft.

18. The rotorcraft as recited in claim 16 wherein the variable thrust cross-flow fan system provides yaw control thrust for the rotorcraft.

19. The rotorcraft as recited in claim 16 wherein the plurality of pitch angle configurations includes a plurality of anti-torque thrust configurations, a neutral configuration and a plurality of pro-torque thrust configurations.

\* \* \* \* \*